Patented Feb. 1, 1944

2,340,672

UNITED STATES PATENT OFFICE 2,340,672

OLEORESIN TREATMENT

Donald A. Lister, Brunswick, Ga., assignor to Hercules Powder Company, Wilmington, Del., a corporation of Delaware No Drawing. Application September 6, 1940, Serial No. 355,615

5 Claims. (Cl. 260—109)

This invention relates to a process of obtaining a highly purified rosin from crude pine oleoresin.

Crude pine oleoresin is obtained by scarifying the bark of the pine tree and catching the exudate in a suitable container. This material as collected from the forest is a viscous, semi-crystalline mass contaminated with sand, wood chips, particles of bark and various other kinds of foreign matter. This crude oleoresin is exceedingly unstable in its chemical composition and from the time it exudes from the trees, it is continually undergoing various chemical changes. It is also acid in its action and wherever it comes into contact with metals especially iron, it tends to pick up still further impurities. When this oleoresin is subjected to treatment for the recovery of rosin, the effect of these various contaminating agents is carried over into the rosin and a dark colored rosin is obtained which is at a serious disadvantage today because paleness in color is a necessary characteristic of rosin for the majority of uses.

In order to make a more merchantable and higher quality product, it has been the practice of the prior art to treat the rosin remaining after the volatile matter has been removed from the oleoresin with various agents for the removal of the contaminating bodies. While causing some improvement in color, the rosin so produced still has a much darker color than is desirable.

A leading object of the present invention is to provide an improved process of producing rosin of light color.

Another object is to provide an improved process of producing gum rosin of light color from crude pine oleoresin.

Another object is to provide a process for producing from crude pine oleoresin gum rosin of lighter color than that heretofore obtained.

Another object is to produce from crude pine oleoresin gum rosin of a given lightness of color more effectively and more economically than is possible with known methods.

Other objects will more fully hereinafter appear.

I have discovered that, when crude pine oleoresin is refined chemically, there is obtained a much higher grade of rosin than is the case where the crude oleoresin is first distilled to remove the turpentine and the rosin residue is refined, as is the usual practice. I have discovered that the refining action is still more effective if the crude pine oleoresin is dissolved in a suitable solvent, and the solution so obtained is subjected to the chemical refining process hereinafter disclosed.

By chemically refining the crude pine oleoresin prior to or at the latest simultaneously with its subjection to any appreciable degree of heat, a much higher refining efficiency and effectiveness is obtained than is the case where the crude oleoresin is subjected to heating or "stilling" and is later subjected to chemical refining. Treating the crude oleoresin before it has been subjected to any appreciable degree of heat is unexpectedly effective compared to the prior practice of chemically treating finished rosin. In this specification, and in the claims appended hereto, the terms "appreciable degree of heat" or "materially elevated temperature" are intended to designate a degree of heat or temperature such as to cause discoloration of the oleoresin or stabilize the fraction of color therein against chemical refining in accordance with the present invention. For example, the crude oleoresin should not have been previously heated to a temperature in excess of about 70° C. to about 80° C., and preferably should not have been heated to a temperature in excess of about 50° C. The terms referred to are intended to denote such a degree of heat.

The process in accordance with this invention preferably comprises the treatment of crude pine oleoresin, free of extraneous matter and water, and prior to the distillation thereof for removal of turpentine and other volatile terpenes, in solution in a suitable water immiscible organic solvent with an aqueous chemical refining medium, and thereafter recovering the rosin by suitable means. I have found that this process is unexpectedly considerably more effective in producing a light colored rosin than a similar treatment applied to the rosin directly recovered from the oleoresin. I am unable to give any exact reason for this, but I have noted the fact that the refining efficiency possessed by the oleoresin increases as the degree of heating, to which it has been subjected prior to refining, decreases.

In proceeding in accordance with my invention crude pine oleoresin, as obtained from the forest, composed approximately of 3 parts of rosin to 1 of turpentine, containing amounts of foreign material or trash ranging from about 0.5% to 5.0% of the weight of the oleoresin and containing suspended water to the extent of about 4% to 15% by weight, may be dissolved by suitable mechanical agitation in a water immiscible organic solvent, such as gasoline or petroleum naphtha, benzol, toluol, wood or gum turpentine, or other inert volatile organic solvent. The rosin concentration in the solution may be adjusted to any convenient amount, but preferably is not over 50% by weight. I have found that a 30% solution of the rosin is a convenient concentration to work with. If turpentine is used as the solvent, it will be found that the solutions are more viscous than those in benzol or gasoline. In addition, turpentine solutions offer some difficulty in the separation thereof from the aqueous solutions of the refining agents.

Although any of the solvents above listed are operable in my process and give a rosin of substantially the same degree of refinement, I have found that gasoline or petroleum naphtha is preferable because such a solvent possesses practical advantages over the others such as low cost, ease of separation from the aqueous acid layers and greater ease in the subsequent operation of water washing after the treatment is complete. By "gasoline or petroleum naphtha," I mean a mixture of petroleum hydrocarbons which is liquid at ordinary temperatures, which has an initial boiling point of from about 70° to about 140°, and an end boiling point of from about 350° F. to about 450° F., which preferably covers such a range and which has a gravity of from about 45° Bé to about 65° Bé. I prefer to use so-called "narrow range" gasoline or petroleum naphtha having a boiling point ranging from about 200° F. to about 270° F.

After dilution of the crude pine oleoresin to a rosin concentration of 50% by weight or less, preferably about 30% by weight, it will be found that the associated extraneous matter and water separate to a great extent from the solution, the upper layer containing the oleoresin in the solvent while the lower layer is composed of water and the extraneous matter. The amount of the lower layer is of course dependent upon the amount of the materials in the original oleoresin. Some of the lighter impurities such as bark, chips, etc., float on the surface and are removed together with the extraneous matter in the lower layer by filtration. The filtered solution on standing settles free of suspended water which may then be removed in a suitable manner. Although this water is not unduly objectionable in the subsequent refining process, it does contain some soluble organic matter and I prefer to remove it from the oleoresin solution.

The oleoresin solution free of extraneous matter and water and preferably in petroleum naphtha solution is then treated with the aqueous chemical refining medium. The refining agent is one which brings about improvement in rosin color grade by chemical action as distinguished from selective solvent refining.

The mechanism of the aqueous refining method of the present invention lies in the formation of water soluble salts by the combination of the refining agent with iron or other metallic contamination in the crude oleoresin. Since these salts go into solution in the water of the refining medium, they are removed when the aqueous phase is separated from the solution of oleoresin. Preferably, this removal of the aqueous phase, following completion of the refining step, is effected by mechanically separating the aqueous phase followed by washing the solution phase with distilled water or other relatively pure water. The degree of refining accomplished appears to be a direct function of the completeness of the iron removal, this iron becoming dissolved in the aqueous layer. When distilled water or other suitably pure water is employed as the refining agent, the mechanism of the reaction is somewhat less understood but is believed to be the result of acetic acid or some other water soluble acid dissolved by the water from the rosin layer, effecting dissolution of the iron in the water layer. While reference is made to the removal of iron, the invention is not confined thereto since the process may involve removal of other metals or of color bodies generally.

Preferably, the refining agent is one which exerts a chemical refining action as distinguished from a selective solvent action upon the crude oleoresin, and which exerts substantially no polymerizing influence upon the rosin or terpene present in the crude oleoresin. In addition, it is preferred to use a refining agent which does not result in objectionable charring or discoloration of the oleoresin, since such result would defeat the purpose of the present invention to a large extent.

The purification may be accomplished by many different refining agents, which act with widely varying degrees of efficiency, but which refine the crude oleoresin to substantially the same degree. Examples of suitable refining agents are aqueous solutions of the following compounds: acids such as organic acids such as the lower fatty water miscible acids, as for example, formic, acetic, propionic, butyric, etc.; the lower saturated dibasic acids such as oxalic, malonic, succinic, etc.; inorganic acids of which sulfuric and phosphoric are preferred. Other inorganic acids may be used, such as hydrofluoric acid, or less preferably the other hydrohalide acids such as hydrochloric, hydrobromic, and hydroiodic which, however, are somewhat objectionable because they tend to alter the oleoresin. Sulfurous acid and boric acid have been found satisfactory. While nitric acid may be used, it is generally undesirable because of the marked tendency to oxidize the oleoresin constituents. Instead of the inorganic polybasic acids, acid salts thereof may be used, such as for example, sodium acid fluoride, sodium acid sulfate, sodium acid sulfite, monosodium acid phosphate, etc. In some cases the normal salts may be employed, particularly, such salts as sodium hydrosulfite, sodium silicofluoride, etc. Instead of an aqueous solution of the compound, water itself may be used as the refining agent. It is preferred to use distilled water or other fairly pure water in making up the solutions of the refining agent or as the refining agent where water alone is used.

The refining agents described above vary considerably in their efficiency and in the preferred mode of application thereof. The concentration of the compound in the refining medium may vary within wide limits depending upon the mode of carrying out the treatment and other factors. The amount of refining compound employed may likewise vary within wide limits.

The treatment may be conducted by washing the oleoresin solution with the refining medium, for example, by conducting the washing either at ordinary temperatures or at moderately elevated temperatures. The temperature at which the washing is carried out may vary from the freezing point of the refining medium up to the refluxing point of the mixture. Preferably, the washing is accomplished by agitating the solution of oleoresin and the refining medium so as to bring them into intimate relationship. It will be understood that since the two phases are immiscible with one another, vigorous agitation will be necessary to effect the desired intimacy of admixture and effectiveness of treatment.

Instead of conducting the operation below the boiling point of the refining medium, it may less preferably be carried out at the refluxing temperature of the mixture. If desired, a closed vessel or a vessel under pressure can be employed thus permitting the use of temperatures higher than 100° C., say up to 150° C., the mixture being prevented from boiling or refluxing by reason of the pressure or the closing of the system.

The wide variation possible in the mode of application of the aqueous refining medium may be indicated by the following detailed discussion showing the general effects of various refining agents under various conditions. 5% aqueous formic acid was found effective at room temperature. 50% aqueous formic acid was much more rapid in its refining action. Acetic acid in a concentration of from 0.05 to 0.1% was effective at the boiling temperature. Acetic acid of a concentration of from 5 to 50% exerted a good refining action at 25° C. Oxalic acid is effective slowly in the cold, more rapidly at 60° C. Excellent results were obtained using 5–12% concentration, the maximum soluble in water at room temperature. Higher concentrations, say to 30–60% are possible when using hot water and carrying out the treatment at elevated temperature. Such higher concentrations of oxalic acid are still more effective refining agents. The dihydrate of oxalic acid was also found to be very effective.

Sulfuric acid is an effective refining agent in a 5% concentration at room temperature, 25–30° C. However, aqueous sulfuric acid exerts satisfactory refining within the range of from about 5 to about 50% concentration. The use of concentrations markedly above 50% is not ordinarily desirable because the product is charred or discolored or polymerized by such high concentrations as, for example, 75%.

Phosphoric acid is approximately twice as rapid in its refining action as sulfuric acid, being very effective in the 5% concentration at room temperature. This refining results within the range of from about 5% to about 75%. An advantage of phosphoric acid over sulfuric is that it shows much less tendency to char, discolorize or polymerize.

Of the hydrohalide acids, hydrofluoric is preferred especially in the lower concentrations. Good refining action without objectionable polymerization or decomposition results with the concentration varying from about 5% up to about 40%. If desired, however, concentrations higher than 40% say to 75% may be employed. Of the other three hydrohalide acids, hydrochloric is most desirable, since it shows less tendency to objectionably alter the oleoresin although it is in general a less effective refining agent than for example oxalic acid, acetic acid, sulfuric acid, phosphoric acid, and the like. Refining occurs with concentrations of hydrochloric varying from about 10% to about 35%. Similar concentrations of hydrobromic and hydroiodic acid may be used. The hydrohalide acids are readily effective at temperatures varying from room temperature up to 100° C.

Sodium hydrosulfite at less than 1% concentration was found effective in the cold. While sodium silicofluoride exerts an appreciable refining action at room temperature in a concentration in the neighborhood of 0.5 to 1%, it is much more effective at the refluxing temperature, at which it may be used for example, in concentrations as low as 0.1%.

Aqueous sodium acid sulfate in a 10% concentration was found to exert about the same activity at room temperature as 5% sulfuric acid, and the temperature may range as before up to the boiling point at atmospheric pressure or higher.

The amount of the chemical present in the refining medium may vary from about 0.05% to about 150% based on the weight of actual rosin present in the oleoresin solution being treated. As will be apparent from the foregoing, the amount of the chemical refining agent present in the refining medium is subject to variation depending upon the conditions of the treatment, the nature of the refining agent, and numerous other factors.

Pure water is an effective refining agent. Refining of the oleoresin may be accomplished by heating the oleoresin with the water to an elevated temperature, and maintaining it at this temperature for a suitable period of time. However, it is preferred to reflux the solution of oleoresin with the distilled water for a prolonged period, followed if desired by separation of the water layer and washing with pure water or repetition of the refluxing treatment.

If desired, upon completion of the treatment the water or aqueous layer may be separated from the solution of oleoresin and the process repeated any number of times.

The amount of aqueous refining medium relative to the amount of oleoresin solution may vary within wide limits, for example from about 50% to about 300% by weight of the aqueous solution based upon the weight of oleoresin solution taken. It is preferable to have present at least an amount by weight of aqueous refining agent equal to the weight of oleoresin solution. I have found that about equal amounts of the aqueous refining agent and the oleoresin solution operate very satisfactorily.

As indicated above, the time of treatment may vary within wide limits for example from about 5 minutes to about 5 hours depending upon the amount and kind of the refining agent, the particular conditions attending the refining operation, and the amount of impurities or color bodies present in the oleoresin. Time of treatment will vary with the temperature of treatment. For example, at a temperature of 60 to 70° C. or higher, a refined rosin of high purity will be obtained by treatment of the oleoresin solution for approximately five to ten minutes. For comparable refining action at lower temperatures, a somewhat longer period of treatment is desirable.

After the treatment of the oleoresin solution with the aqueous refining agent a pale rosin solution is obtained which is substantially free from the impurities which produced the dark color, those being dissolved in the aqueous refining agent. The aqueous layer is then separated from the oleoresin solution and the latter is water washed to remove traces of the refining agent. The solvent and accompanying turpentine are then recovered by distillation of the oleoresin solution and a pale rosin of high purity remains.

The aqueous refining agent may be used repeatedly for the purification of fresh batches of crude oleoresin until its efficiency is impaired, after which it is discarded. One charge of 5% $H_3PO_4$ has been used for purifying 20 successive batches of a crude oleoresin solution in narrow-range gasoline containing 30% of rosin without appreciable loss in efficiency, the operation being conducted in the cold with 30 minutes stirring with an acid to oleoresin solution ratio of one to one. For commercial operation, using phosphoric acid as the refining agent, I have found that the refining of about 80 parts by weight of crude oleoresin solution containing 30% of rosin with 1 part of a 5% phosphoric acid solution is an economical ratio for maximum acid life. With sulfuric acid this ratio will be less.

If desired, the pale rosin thus obtained may be further purified in any suitable manner as for example by a selective solvent refining. I have discovered that selective solvent refining of rosin derived from oleoresin purified in the manner of this invention is more effective than the selective solvent refining of ordinary gum rosin or of gum rosin which has been chemically refined in the usual manner. Thus, by extraction of a solution of the pale rosin derived from chemically refined crude oleoresin in a suitable water immiscible solvent, such as petroleum naphtha with a selective solvent exerting a selective solvent action upon the color bodies in the rosin, a marked improvement in the color of the rosin may be brought about, this improvement being considerably greater than the corresponding improvement effected by selective solvent refining of rosin of a corresponding color grade, but derived from crude oleoresin which has not been chemically refined in accordance with the method of the invention.

For example, rosin of a color grade of 24 Amber or WG prepared by agitation of 30% rosin solution of crude oleoresin in narrow-range gasoline with half its weight of 5% aqueous sulfuric acid for two hours at room temperature, separation of the solution, washing the solution three times with pure water, and recovery of the rosin by distillation, may be dissolved in narrow range gasoline to give a 20% solution, this solution washed with freshly distilled furfural in the ratio of one part furfural to one part of rosin, the mixture cooled to 12° F. and the furfural layer separated and the rosin solution distilled to yield a rosin of color 13 Amber or WW grade. Upon heat treating such a WW rosin, there is obtained a still further purified rosin of a color of 4 Amber or an X+ grade. If the original purified rosin of WG grade is washed twice with furfural in this manner, there is obtained a rosin of a color grade of 7 Amber or an X+ grade which, when heat treated in the usual manner, yields a rosin of color 2.5 Amber or an X+ grade. Instead of furfural as the selective solvent, any other selective solvent for rosin color bodies may be used such as furfural alcohol, aniline, chlorohydrin such as ethylene chlorohydrin, sulfur dioxide, phenol, resorcinol, etc. If desired, instead of a single wash with the selective solvent, a counter current washing cycle may be used in known manner.

Instead of evaporating the chemically refined oleoresin in solution in gasoline or the like and dissolving the rosin thus obtained in gasoline or the like prior to selective solvent refining of the chemically refined rosin, the selective solvent treatment may be applied directly to a solution of the chemically refined oleoresin in gasoline or the like.

Practical embodiments of the method in accordance with this invention, and the Lovibond color determinations of the rosins produced thereby, are illustrated by the examples which follow:

Example 1

A quantity of crude pine oleoresin as received is dissolved in a quantity of "narrow range" gasoline (B. R. 200° F. to 270° F.) such that the rosin concentration in the solution after the latter is filtered to remove insoluble matter and settled to remove water, is 30% by weight of the resultant solution. Two hundred parts by weight of a 5% aqueous solution of phosphoric acid are then added to 200 parts by weight of the oleoresin solution. These two solutions were agitated together for 10 minutes at 60° C. Agitation was then stopped and the mixture allowed to separate into two layers. The rosin solution was then separated from the aqueous layer, given three distilled water washes after which the solution was subjected to distillation for the recovery of gasoline and turpentine, the rosin remaining as a residue. The color of the rosin so obtained on the Lovibond scale was 24 Amber or a WG grade. The color of the rosin directly obtained from the oleoresin was 40 Amber+0.5 red or an M grade. Treatment in accordance with my process thus improved the rosin two grades, which is a distinct improvement.

Example 2

A low grade of crude pine oleoresin was treated in a manner analogous to that shown in Example 1, in the various ways shown in the following table, using gasoline, turpentine, and benzol as the solvents and the same rosin concentration. The rosin, directly recovered from the oleoresin has a Lovibond color of 40 Amber+8.25 red or is a G grade.

| No. | Treatment | Solvent | Color of rosin | Grade |
|---|---|---|---|---|
| 1 | None | | 40A+8.25R | G |
| 2 | 2.5% aqueous sulfuric acid for 2 hours at room temperature. | Gasoline | 23A | WG |
| 3 | 5.0% aqueous phosphoric acid for 30 min. at room temperature. | do | 22A | WG |
| 4 | 5.0% aqueous sulfuric acid for 1 hour at room temperature. | do | 23A | WG |
| 5 | 5.0% aqueous phosphoric acid for 5 min. at 60° C. | do | 21A | WG |
| 6 | 5.0% aqueous phosphoric acid for 5 min. at 29° C. | do | 36A | N |
| 7 | 5.0% aqueous sulfuric acid for 1½ hours at room temperature. | Turpentine. | 34A | N |
| 8 | 5.0% aqueous sulfuric acid for 1 hr. at room temperature. | Benzol | 27A | WG |
| 9 | 5.0% aqueous phosphoric acid for 1 hr. at room temperature. | do | 27A | WG |

The remarkable improvement obtained in the rosin through my treatment of the oleoresin in accordance with this invention is obvious. In the majority of cases the rosin is improved in color from a very dark G grade to one which grades WG which is an improvement of six grades.

Example 3

In order to illustrate the much higher grade of rosin obtainable by proceeding in accordance with my process over that by first recovering the rosin from the crude oleoresin in the usual manner and subsequently subjecting this rosin to refining agents, the following experiments were carried out. All of those experiments were carried out on one batch of oleoresin.

In carrying out this set of experiments the procedure was to sample the oleoresin making up the charge of a commercial gum rosin still. A composite sample of the crude oleoresin was taken from each barrel of the oleoresin charged into the still. At the conclusion of the still run a sample of the finished gum rosin was obtained for color grading and for further refining. This rosin had been directly heated and steamed for about two hours at elevated temperatures in the still during manufacture and is the base color grade of the series. It is sample 1 in the table below.

A portion of the gum rosin still sample was dissolved in benzol to give a rosin concentration of 30%, and this solution was then refined with an equal weight of a 5% aqueous solution of phosphoric acid by agitating the rosin solution with the acid solution for 30 minutes at room temperature. After separation of the solution from the acid and water washing three times with distilled water, the rosin was recovered from solution, by driving off the solvent with direct heat and steam over a period of about 20 minutes. This is sample 2 in the table.

A portion of the composite oleoresin sample, collected as shown above, was dissolved in gasoline to give a 30% concentration of rosin, filtered from its accompanying foreign material and separated from its associated water. This solution was then agitated with an equal weight of a 5% aqueous solution of phosphoric acid for 30 minutes at room temperature. After separation of the treated solution from the acid solution, it was water washed three times with distilled water and the rosin recovered by distilling off the gasoline and turpentine by direct heat and steam over a period of 20 minutes. This is sample 3 in the table.

The comparison of these three samples is shown in the following table.

| Sample No. | Lovibond color of rosin | Grade of rosin |
|---|---|---|
| 1 | 40 amber+16 red | F |
| 2 | 40 amber+3 red | I |
| 3 | 15 amber | WW |

It is thus seen that rosin obtained from the crude oleoresin by distillation of the latter according to a method long used in the art is only of F grade. Subsequent treatment of this rosin with a refining agent found highly effective when used in accordance with the process of the present invention, yields only a rosin of I grade which is an improvement of 3 grades but an I rosin is still much darker than desirable for most purposes. On the other hand, the same oleoresin directly treated in accordance with this invention yields a rosin of WW grade or an improvement of 8 grades. By a relatively simple treatment, I have made a very pale rosin from a low grade oleoresin which has heretofore yielded only darker grades of rosin even after purification of the rosin originally obtained from the oleoresin by direct distillation. My process thus becomes applicable to the purification of low grade oleoresins for the production of high grade rosins.

*Example 4*

Crude pine oleoresin which produced directly a gum rosin of K grade was dissolved in petroleum naphtha, filtered and washed with water to yield a 30% solution of rosin derived from the crude oleoresin. 200 g. of this solution was admixed with 200 g. of distilled water and 0.2 g. of oxalic acid dihydrate. The mixture was refluxed for two hours. The acid water layer was then drawn off and another wash of 200 g. of water and 0.2 g. of oxalic acid was added. This mixture was refluxed for 2½ hours. The acid water layer was again separated, the rosin solution given three washes with distilled water, and the rosin recovered from the solution by distillation. The color of the refined rosin was 28 Amber or an N grade whereas the original rosin had a color of 40 Amber+1.25 Red or a K grade.

*Example 5*

There is first prepared a solution of oleoresin in turpentine by dissolving the oleoresin in ordinary turpentine, filtering and washing with water. The solution contained 30% by weight of rosin derived from the oleoresin. To 150 g. of this solution was added 150 g. of distilled water and 0.2 g. of sodium silico fluoride. The mixture was refluxed for two hours. The water layer was separated from the refined solution, the solution of rosin given three water washes with distilled water and the rosin recovered from the solution by evaporation of the turpentine therefrom. There was obtained a refined rosin having a color of 32 Amber, or an N grade, whereas the color of the original rosin in solution was 40 Amber+1.25 Red or a K grade.

*Example 6*

There was prepared a solution of oleoresin yielding rosin of K grade in petroleum naphtha, the solution containing 30% of rosin. 150 g. of this solution were admixed with 200 g. of water and 1.1 g. of sodium silicofluoride. The mixture was stirred overnight at room temperature. The treated solution was then separated from the water layer, given three water washes with distilled water and the rosin recovered from the solution by evaporation. The refined rosin had a color of 40 Amber+0.15 Red or an M grade, whereas the original rosin was of a color of K grade.

*Example 7*

There was prepared a solution of oleoresin in petroleum naphtha. The oleoresin was such as to yield a G grade rosin. This solution contained 30% of rosin by weight. 200 g. of this solution filtered but not water washed was admixed with 200 g. of distilled water and 0.5 g. of sodium hydrosulfite. It was stirred for one hour at room temperature. 0.5 g. of sodium hydrosulfite was then added and the stirring continued for another hour. 0.8 g. of sodium hydrosulfite was then added and the stirring continued for 30 minutes. The refined rosin solution was separated from the water hydrosulfite layer, washed three times with water and evaporated to recover the rosin. The refined rosin had a color of 22 Amber or a WG grade, whereas the original rosin had a color of 40 Amber+7.5 Red or a G grade.

*Example 8*

A quantity of crude oleoresin yielding a K grade rosin was dissolved in petroleum naphtha to a 50% rosin concentration, the solution being filtered free of trash. 100 g. of the solution was boiled with four successive 200 g. washes of distilled water for a period of two hours for each boil. Upon separating the treated rosin solution from the fourth and final water boil, its rosin was recovered in the usual manner by evaporation. The original rosin present in crude oleoresin yielded a color of 40 Amber+1.25 Red or a K grade and contained 0.0072% of iron. The treated rosin after four water boils had a color of 26 amber of a WG grade and contained 0.0002% of iron.

Example 9

1060 parts by weight of crude oleoresin were dissolved in 570 parts by weight of turpentine, the water layer separated and the residual solution filtered, and the solution dissolved in an equal weight of turpentine. The resulting solution contained approximately 25% of rosin. 80 g. lots of the solution were washed with 200 cc. of aqueous acid, as indicated in the following table. The washing was conducted by vigorously agitating the oleoresin solution with the aqueous acid for a period of about 10 minutes. Following this treatment, layer separation was allowed to take place whereupon the aqueous acid layer was removed, the solution of oleoresin washed with water until all residual acid had been removed, and the solvent then evaporated at reduced pressure to yield the rosin.

| Acid | Acid concentration | Treating temperature | Color grade of rosin obtained |
|---|---|---|---|
| | Per cent | °C. | |
| Phosphoric | 5 | 25 | H |
| Do | 5 | 50 | I+ |
| Do | 50 | 25 | H+ |
| Do | 50 | 50 | K+ |
| Do | 75 | 25 | N |
| Do | 75 | 50 | K |
| Sulfuric | 5 | 25 | M |
| Do | 5 | 50 | I |
| Do | 50 | 25 | K |
| Do | 50 | 50 | I |
| Acetic | 5 | 25 | M |
| Do | 5 | 50 | M |
| Do | 50 | 25 | M |
| Do | 50 | 50 | M+ |
| Propionic | 43 | 25 | M+ |
| Do | 43 | 75 | M |
| Formic | 50 | 25 | M+ |
| Do | 50 | 75 | I |
| Hydrochloric | 20 | 25 | I |
| Do | 20 | 75 | K+ |
| Oxalic | 5 | 25 | K+ |
| Do | 5 | 50 | M+ |
| Do | 12 | 25 | M+ |
| Do | 12 | 50 | M |

From the foregoing, it will be seen that the 50% aqueous acids are the most effective refining agents. However, as indicated above, for reasons of economy, it is preferred to use either 5% phosphoric acid or 5% sulfuric acid as the refining agent.

Example 10

200 g. of a solution of crude oleoresin in narrow range gasoline containing 30% of rosin of a G grade were admixed with 200 g. of 5% hydrochloric acid, stirring being continued for 30 minutes at 40–45° C. After a thorough water washing of the solution, the rosin was recovered by evaporation of the solvent. The product had a color of M.

Example 11

200 g. of a solution of crude oleoresin in narrow range gasoline containing 30% of rosin of a G grade were admixed with 100 g. of 5% sulfuric acid and 100 g. of 5% nitric acid. The mixture was stirred for one hour and 30 minutes at room temperature. The final temperature was 30° C. The recovered rosin had a color of K.

It will be understood that the foregoing examples are by way of illustration only and that the scope of my invention is not limited thereto.

What I claim and desire to protect by Letters Patent is:

1. The process of recovering a high grade pale rosin from crude pine oleoresin which has not previously been heated to a materially elevated temperature, which comprises forming a solution thereof in a water immiscible volatile organic solvent, separating said solution from aqueous phase, dirt and extraneous matter, said solution containing not more than about 50% by weight of rosin, admixing said solution intimately with at least about 50% by weight of an aqueous solution of an inorganic acid, said acid solution containing from about 5% to about 75% by weight of said acid, for a period of time of from about 5 minutes to about 5 hours, separating the resulting aqueous acid phase from the resulting organic solution phase, washing said organic solution phase with water, and evaporating the solvent therefrom to recover as the residue the rosin contained therein.

2. The process of recovering a high grade pale rosin from crude pine oleoresin which has not previously been heated to a materially elevated temperature, which comprises forming a solution thereof in a water immiscible volatile organic solvent, separating said solution from aqueous phase, dirt and extraneous matter, said solution containing not more than about 50% by weight of rosin, admixing said solution intimately with at least about 50% by weight of an aqueous solution of phosphoric acid containing about 5% by weight of $H_3PO_4$, for a period of time of from about 5 minutes to about 5 hours, separating the resulting aqueous acid phase from the resulting organic solution phase, washing said organic solution phase with water, and evaporating the solvent therefrom to recover as the residue the rosin contained therein.

3. The process of recovering a high grade pale rosin from crude pine oleoresin which has not previously been heated to a materially elevated temperature which comprises forming a solution thereof in a water immiscible volatile organic solvent, separating said solution from aqueous phase, dirt and extraneous matter, said solution containing not more than about 50% by weight of rosin, admixing said solution intimately with at least about 50% by weight of an aqueous solution of sulfuric acid containing about 5% by weight of $H_2SO_4$, for a period of time of from about 5 minutes to about 5 hours, separating the resulting aqueous acid phase from the resulting organic solution phase, washing said organic solution phase with water, and evaporating the solvent therefrom to recover as the residue the rosin contained therein.

4. The process of recovering a high-grade pale rosin from crude pine oleoresin which has not previously been heated to a materially elevated temperature, which comprises forming a solution thereof in a water immiscible volatile organic solvent, separating said solution from aqueous phase, dirt and extraneous matter, said solution containing not more than about 50% by weight of rosin, admixing said solution intimately with at least 50% by weight of an aqueous solution of sulfuric acid containing between about 5% and about 50% by weight of sulfuric acid, separating the resulting aqueous acid phase from the resulting organic solution phase, washing said organic solution phase with water, and evaporating the solvent therefrom to recover as the residue the rosin contained therein.

5. The process of recovering a high-grade pale rosin from crude pine oleoresin which has not previously been heated to a materially elevated temperature, which comprises forming a solution thereof in a water immiscible volatile organic solvent, separating said solution from aqueous phase, dirt and extraneous matter, said solution containing not more than about 50% by weight of rosin, admixing said solution intimately with at least 50% by weight of an aqueous solution of phosphoric acid containing between about 5% and about 75% by weight of phosphoric acid, separating the resulting aqueous acid phase from the resulting organic solution phase, washing said organic solution phase with water, and evaporating the solvent therefrom to recover as the residue the rosin contained therein.

DONALD A. LISTER.